(12) United States Patent
Wang

(10) Patent No.: US 12,530,208 B2
(45) Date of Patent: Jan. 20, 2026

(54) METHOD FOR DISPLAYING APPLICATION INTERFACE, DEVICE, AND STORAGE MEDIUM

(71) Applicant: GUANGDONG OPPO MOBILE TELECOMMUNICATIONS CORP., LTD., Guangdong (CN)

(72) Inventor: Zhaojin Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 159 days.

(21) Appl. No.: 18/462,038

(22) Filed: Sep. 6, 2023

(65) Prior Publication Data
US 2023/0409355 A1   Dec. 21, 2023

Related U.S. Application Data

(63) Continuation of application No. PCT/CN2022/079536, filed on Mar. 7, 2022.

(30) Foreign Application Priority Data

Apr. 6, 2021   (CN) .......................... 202110366882.3

(51) Int. Cl.
  *G06F 9/451*  (2018.01)
  *G06F 1/16*   (2006.01)
  *G06F 15/163* (2006.01)

(52) U.S. Cl.
  CPC .............. *G06F 9/451* (2018.02); *G06F 1/163* (2013.01); *G06F 15/163* (2013.01)

(58) Field of Classification Search
  CPC .......... G06F 9/451; G06F 1/163; G06F 15/163
  See application file for complete search history.

(56) References Cited

U.S. PATENT DOCUMENTS 10,198,057 B2 *  2/2019  Bae ...................... G06F 1/3293
10,379,497 B2 *  8/2019  Block .................... G04G 9/00
(Continued)

FOREIGN PATENT DOCUMENTS

CN       103782272       5/2014
CN       105204931       12/2015
(Continued)

OTHER PUBLICATIONS

WIPO, International Search Report and Written Opinion for International Application No. PCT/CN2022/079536, May 19, 2022.
(Continued)

*Primary Examiner* — Tadesse Hailu
(74) *Attorney, Agent, or Firm* — Hodgson Russ LLP

(57) ABSTRACT

A method for displaying an application interface, a device, and a storage medium are provided. The method includes the following. An interface of a target application is drawn by a first system and displayed by the first system in response to an application start-up instruction of the target application when the first system is in a wake-up state and a second system is in a sleep state. The interface of the target application is drawn by the second system in response to the second system switching from the sleep state to the wake-up state. The interface of the target application is displayed by the second system, and the target application is run by the second system in response to the second system completing drawing the interface.

20 Claims, 11 Drawing Sheets

(56) References Cited

U.S. PATENT DOCUMENTS

| | | | |
|---|---|---|---|
| 11,815,980 B2 * | 11/2023 | Mizuno | G06F 1/3293 |
| 2010/0122077 A1 | 5/2010 | Durham | |
| 2016/0055031 A1 | 2/2016 | Tu et al. | |
| 2016/0132369 A1 * | 5/2016 | Lee | G06F 1/3228 |
| | | | 713/323 |
| 2016/0162058 A1 * | 6/2016 | You | G06F 3/03547 |
| | | | 345/157 |
| 2017/0075316 A1 * | 3/2017 | Berdinis | G06F 1/163 |
| 2019/0268834 A1 * | 8/2019 | Jung | H04W 8/005 |
| 2020/0319699 A1 * | 10/2020 | Mizuno | G04G 19/00 |
| 2021/0085861 A1 * | 3/2021 | Patel | G16H 40/67 |

FOREIGN PATENT DOCUMENTS

| | | |
|---|---|---|
| CN | 105589743 | 5/2016 |
| CN | 105793821 | 7/2016 |
| CN | 106843798 | 6/2017 |
| CN | 106843951 | 6/2017 |
| CN | 107256165 | 10/2017 |
| CN | 107678824 | 2/2018 |
| CN | 112579187 | 3/2021 |
| JP | H11249754 | 9/1999 |

OTHER PUBLICATIONS

EPO, Extended European Search Report for EP Application No. 22783826.5, Sep. 2, 2024.
JPO, Office Action for JP Application No. 2023-556870, Oct. 8, 2024.
CNIPA, First Office Action for CN Application No. 202110366882. 3, Jun. 12, 2025.
CNIPA, Rejection Decision for CN Application No. 202110366882. 3, Oct. 23, 2025.

* cited by examiner

METHOD FOR DISPLAYING APPLICATION INTERFACE, DEVICE, AND STORAGE MEDIUM

CROSS-REFERENCE TO RELATED APPLICATION(S)

This application is a continuation of International Application No. PCT/CN2022/079536, filed Mar. 7, 2022, which claims priority to Chinese Patent Application No. 202110366882.3, filed Apr. 6, 2021, the entire disclosures of which are incorporated herein by reference.

TECHNICAL FIELD

This disclosure relates to the field of wearable devices, and in particular, to a method for displaying an application interface, a device, and a storage medium.

BACKGROUND

A wearable device is a portable electronic device that can be directly worn or integrated into clothing or accessories. Common wearable devices include a smartwatch, a smart wristband, smart glasses, or the like.

Taking the wearable device as a smartwatch as an example, a user may use the wearable device to check the time, or use an application installed in the wearable device to realize functions such as sleep quality monitoring, motion statistics, notification-and-message checking, or the like.

SUMMARY

Disclosed herein are embodiments of a method for displaying an application interface, a device, and a storage medium. Technical solutions of the present disclosure are listed below.

In one aspect, embodiments of the present disclosure provide a method for displaying an application interface. The method is applicable to a wearable device, and the wearable device supports running of a first system and a second system. The method includes the following. An interface of a target application is drawn by the first system and displayed by the first system, in response to an application start-up instruction of the target application when the first system is in a wake-up state and the second system is in a sleep state. The interface of the target application is drawn by the second system in response to the second system switching from the sleep state to the wake-up state. The interface of the target application is displayed by the second system and the target application is run by the second system, in response to the second system completing drawing the interface.

In another aspect, embodiments of the present disclosure provide a wearable device. The wearable device includes a processor and a memory. The memory stores at least one instruction, and the at least one instruction is configured to be executed by the processor to perform the method for displaying an application interface according to the foregoing aspect.

In another aspect, embodiments of the present disclosure provide a non-transitory computer-readable storage medium. The storage medium stores at least one instruction, and the at least one instruction is configured to be executed by a processor to perform the method for displaying the application interface according to the foregoing aspect.

DETAILED DESCRIPTION

Figure 1:
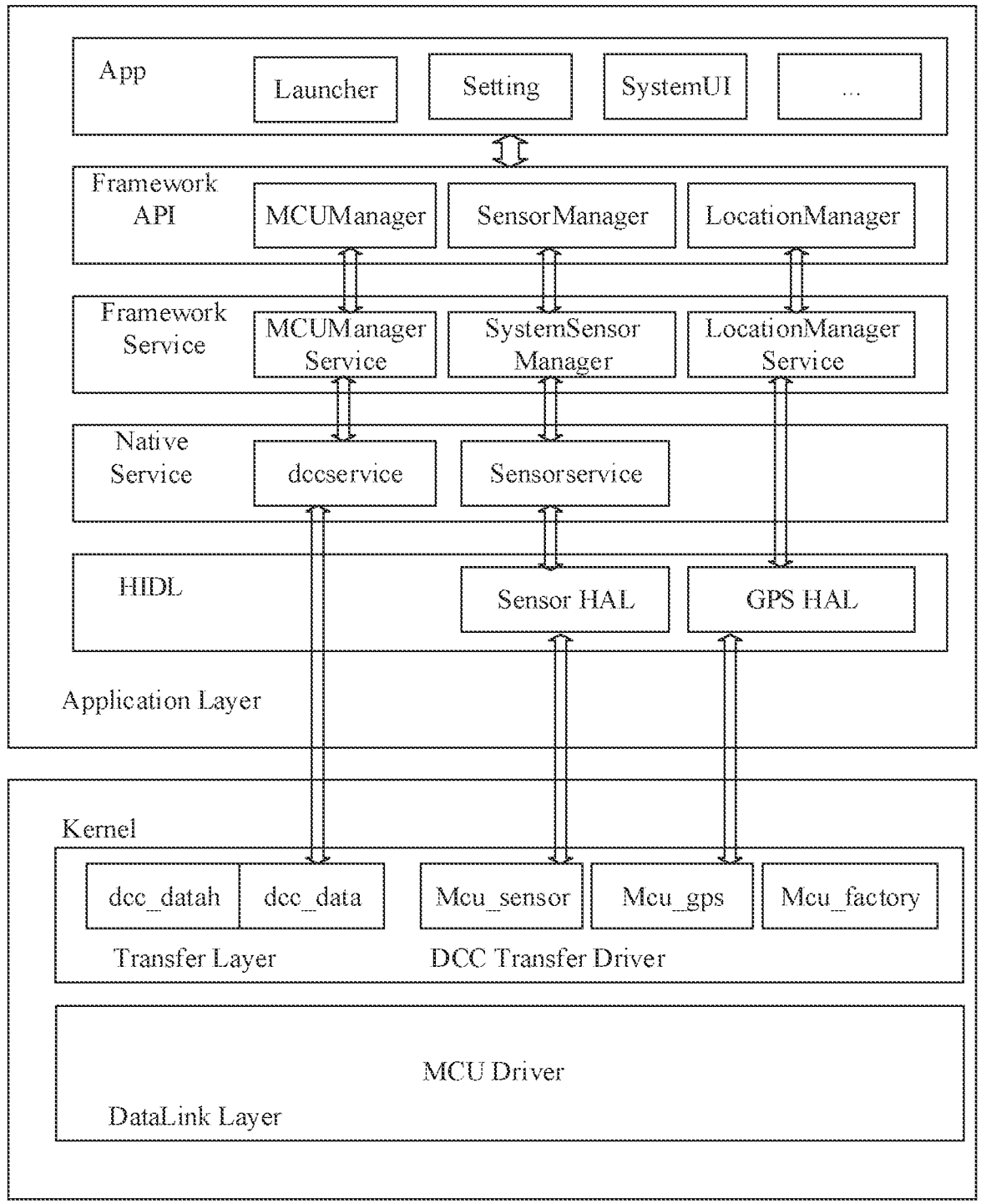
FIG. 1 is a schematic diagram illustrating that a dual-core communication software framework of a second processor provided in an exemplary embodiment of the present disclosure.

In order to make purposes, technical solutions, and advantages of the disclosure clearer, the following will further describe in detail embodiments of the disclosure with reference to accompanying drawings.

In this disclosure, the term "multiple" or "a plurality of" refers to "two or more than two". The term "and/or" illustrate an association relationship of associated objects, indicating that three relationships can exist, for example, A and/or B, which can indicate the existence of A alone, A and B together, and B alone. In addition, the character "/" in this disclosure generally indicates that associated objects are in an "or" relationship.

In the related art, a wearable device is configured with a single processor that processes, by running an operating system on the processor, all system events generated during running of the device. Therefore, the processor needs to have a powerful data processing capability and remain in a working state during the running of the device. However, the wearable device only needs to realize some functions that require low processing performance in most cases in daily use. Taking a smartwatch or a smart wristband as examples, the smartwatch or the smart wristband only needs to perform a time display and message prompt in most cases. Therefore, the processor remaining in the working state for a long time does not improve the performance of the wearable device, but increases the power consumption of the device, resulting in a shorter battery life of the wearable device.

In order to reduce the power consumption of the wearable device while ensuring the performance of the wearable device, in a possible embodiment, the wearable device is configured with at least a first processor and a second processor that have different processing performances and power consumption. The first processor is configured to run the first system, and the second processor is configured to run the second system (namely, a dual-core dual system). A set of system switching mechanisms is designed for the dual-core dual-system.

During the running of the wearable device, the first system is run by a processor with low-power consumption to process an event that requires low processing performance, and a processor with high-power consumption remains in a sleep state (correspondingly, the second system run by the processor with high-power consumption is in the sleep state), thus reducing power consumption of the wearable device while realizing a basic function of the wearable device. When an event that require high processing performance occurs (for example, when an application program is started), the processor with high-power consumption is woken up and the second system is switched to process the event, so as to ensure that a triggered event can be responded to and processed in time to satisfy a performance requirement of the wearable device.

In addition, since switching the processor with high-power consumption from the sleep state to a wake-up state needs to take a certain time (at least 200 ms to 300 ms), in order to reduce a delay in displaying an application screen while starting an application, the present disclosure introduces a mechanism of pre-displaying a start-up effect. The first system run by the processor with low-power consumption draws and displays an application interface before the processor with high-power consumption is woken up. When the processor with high-power consumption is woken up, the second system run by the processor with high-power consumption displays the application interface and runs the application to pre-display an application star-up effect, thus improving the visual speed of starting an application and reducing the delay in displaying the application screen during system switching.

In this embodiment of the present disclosure, the first processor and the second processor work asynchronously, and the first system and the second system need to realize system communication (or referred to as dual-core communication). In a possible application scenario, the first system is a real-time operating system (RTOS) run by a micro control unit (MCU), and the second system is an Android operating system run by a central processing unit (CPU).

As illustrated in FIG. 1, FIG. 1 illustrates a dual-core communication software framework of the Android operating system provided in an exemplary embodiment of the present disclosure. The dual-core communication software framework adheres to the design principles of "low coupling, high reliability, and high multiplexing", and includes developments of a kernel module, a hardware abstraction layer interface definition language (HIDL) module, a native service module, a framework service module, a framework application programming interface (API) module, and an application (APP) module.

The APP module includes functional modules such as a launcher (desktop launcher), a setting, a system user interface (UI), or the like. The framework API module includes management modules such as an MCU manager, a sensor manager, a location manager, or the like. The framework service module includes service modules such as an MCU manager service, a system sensor manager, a location manager service, or the like. The native service module includes service modules such as a data call control service (dcc service), a sensor service, or the like. The HIDL module includes modules such as a sensor hardware abstraction layer (HAL), a global positioning system (GPS) HAL, or the like. The kernel module includes DCC transfer drivers such as dcc_datah, dcc_data, Mcu_sensor, Mcu_gps, Mcu_factory, or the like.

A transport layer serves as an interface layer connecting an upper layer and a lower layer in a dual-core communication software framework. The transport layer is configured to shield a transport detail of communication at the lower layer (a data link layer) of a system from an application layer and provide a service channel for an application scenario. The application layer, as a main provider of services, is configured to respond to human-computer interaction, transmit data generated during human-computer interaction through a transmission layer, and respond to an external data request.

Figure 2:
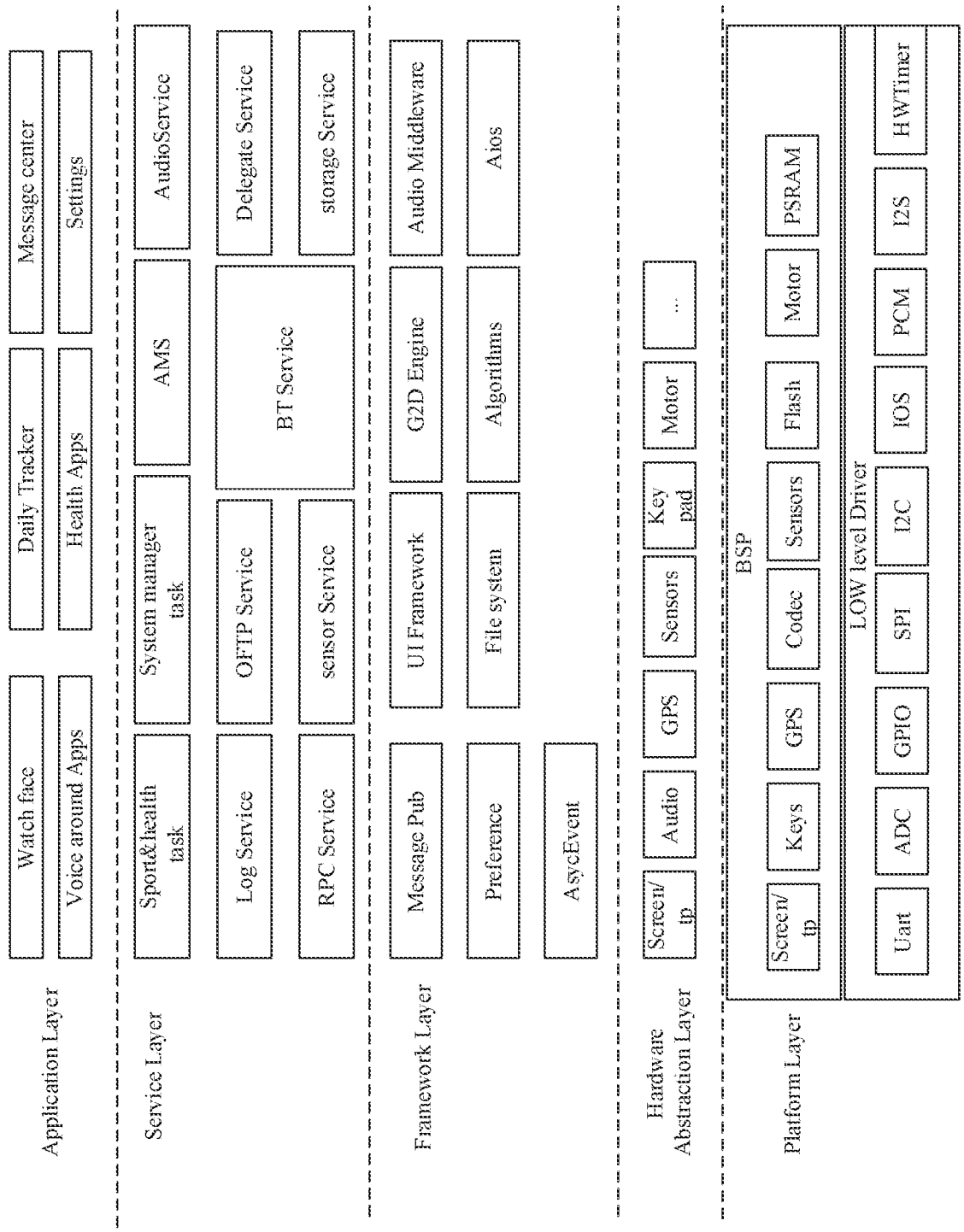
FIG. 2 is a schematic diagram illustrating a dual-core communication software framework of a first processor provided in an exemplary embodiment of the present disclosure.

The RTOS is designed under the principle of equivalence. Taking the wearable device as a smartwatch as an example, as illustrated in FIG. 2, FIG. 2 illustrates a dual-core communication software framework of the RTOS provided in an exemplary embodiment of the present disclosure.

The dual-core communication software framework of the RTOS is divided into an application layer, a service layer, a framework layer, a HAL, and a platform layer.

The application layer includes application modules such as a watch face, a daily tracker, a message center, voice around Apps, health Apps, settings, or the like. The service layer includes service modules such as a sport & health task, a system manager task, an activity management service (AMS), an audio service, a log service, an Odette file transfer protocol (OFTP) service, a Bluetooth (BT) service, a delegate service, a remote procedure call (RPC) service, a sensor service, a storage service, or the like. The framework layer includes framework modules such as a message pub, a UI framework, a graphics 2D (G2D) Engine, an audio middleware, a preference, a file system, algorithms, an advanced input output system (Aios), an AsycEvent, or the like. The HAL includes hardware abstraction modules such as a screen/touch panel (TP), an audio, a GPS, sensors, a keypad, a motor, or the like. The platform layer includes a board support package (BSP) and a low-level driver, where the BSP includes a screen/TP, keys, a GPS, a codec, sensors, a flash, a motor, a pseudo static random access memory (PSRAM), or the like; and the low-level driver includes a universal asynchronous receiver/transmitter (Uart), an analog-to-digital converter (ADC), a general purpose input/output (GPIO), a serial peripheral interface (SPI), an inter-integrated circuit (I2C), an input/output system (IOS), a pulse-code modulation (PCM), an inter-IC sound (I2S), and a hardware (HW) timer.

It should be noted that the foregoing dual-core communication software framework is only used for exemplary description, and a person skilled in the art may add, delete or modify the foregoing framework according to actual requirements. This disclosure does not limit a specific structure of the dual-core communication software framework.

Figure 3:
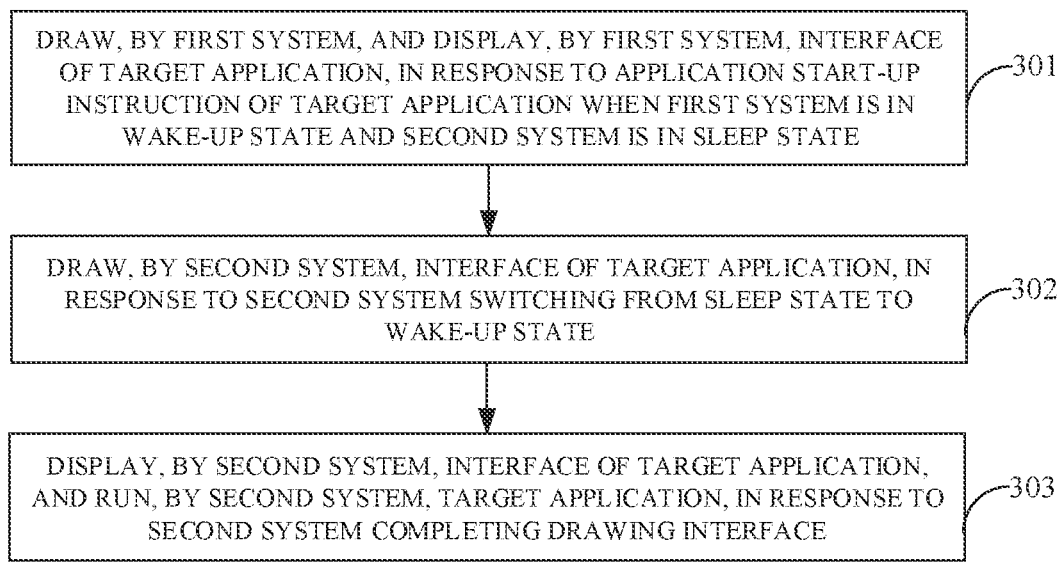
FIG. 3 is a flowchart of a method for displaying an application interface provided in an exemplary embodiment of the present disclosure.

Reference is made to FIG. 3, which is a flowchart of a method for displaying an application interface provided in an exemplary embodiment of the present disclosure. In this embodiment, for example, the method is applicable to a wearable device that supports running of a first system and a second system. The method includes the following.

At block 301, an interface of a target application is drawn by the first system and displayed by the first system in response to an application start-up instruction of the target application when the first system is in the wake-up state and the second system is in the sleep state.

In a possible embodiment, the wearable device is configured with a first processor and a second processor, where the first processor has processing performance lower than the second processor (the first processor has both processing capability and processing speed lower than the second processor), and the first processor has power consumption lower than the second processor. Correspondingly, the second system (run by the second processor) can process an event processed by the first system (run by the first processor), and the first system may not necessarily process the event processed by the second system.

In another possible embodiment, the wearable device may also be configured with a single processor, and the first system and the second system are respectively run by different cores of the processor, where processing performance of a core running the second system is higher than processing performance of a core running the first system.

Taking the wearable device as a smartwatch as an example, the first processor is an MCU, the second processor is a CPU, the first system is an RTOS, and the second system is an Android system. Correspondingly, the event that can be processed by the first system includes scenarios requiring low processing performance or weak interaction scenarios, such as watch face display, watch-face interface switch, notification-and-message display, or the like. The event that can be processed by the second system includes scenarios requiring high processing performance or strong interaction scenarios, such as incoming calls answering, application starting, watch-face editing, function setting, or the like.

In a possible embodiment, a working mode of the wearable device may be a performance mode, a hybrid mode, or a low-power mode. In the performance mode, the second processor and the first processor both remain in the wake-up state (correspondingly, the first system and the second system are both in the wake-up state). In the low-power mode, only the first processor remains in the wake-up state, and the second processor is in an off state (that is, the first system is in the wake-up state, and the second system is in the off state). In the hybrid mode, the second processor is in a standby state and can switch between the sleep state and the wake-up state when the first system processes an event (that is, when the first system is in the wake-up state, the second system may be in the wake-up state or in the sleep state).

Optionally, in the wake-up state, system-related data is cached in a memory such as a random access memory (RAM) and can be run at any time. In the sleep state, most hardware modules of the processor are turned off, system-related data is stored in a hard disk such as a read-only memory (ROM), and the system-related data is written into the memory from the hard disk when the sleep state is switched to the wake-up state.

Unlike an electronic device with strong interaction such as a smartphone, the wearable device is an auxiliary electronic device and only has weak interactions with a user in most usage scenarios. For example, the user only raises their wrists to check the time or message prompt through the smartwatch in most scenarios. Therefore, the second processor is controlled to be in the sleep state (that is, the second system is controlled to be in the sleep state) to reduce overall power consumption of the wearable device when the wearable device processes the event by the first system.

Receiving the application start-up instruction of the target application indicates that the target application needs to be started and run, when the first system is in the wake-up state and the second system is in the sleep state. Since the first system is unable to run the target application, the second system in the sleep state needs to be woken up, and the target application is started and run by the second system.

However, because a wake-up process of the second system takes a certain time (at least 200 ms to 300 ms), there will be a short period of no response after triggering the start-up of the target application (manifested as waiting for a period of time before the application screen appears), which affects users' experience. In this embodiment of the present disclosure, in order to reduce the delay in displaying the application screen during system switching, the wearable device first draws the interface of the target application by the first system and displays the interface by the first system (the first system is only responsible for drawing the graphic interface, rather than starting or running the target application) when the wearable device receives the application start-up instruction of the target application during running of the first system.

Optionally, the application start-up instruction can be triggered via a shortcut key (for example, a physical key) or triggered via a widget in the first system. The target application may be a health-monitoring application, an instant messaging application, a timing application, an alarm application, a sports application, or the like. The interface of the target application may be a static picture (such as a first frame of the application interface) or a dynamic picture (such as a start-up animation of an application start-up process). This embodiment of the present disclosure does not limit the trigger manner of the application start-up instruction, a type of the target application, and a type of the interface.

The first system can immediately draw and display the interface of the target application after receiving the application start-up instruction because the first system is in the wake-up state. In other words, the first system can immediately display the interface of the target application after the start-up of the target application is triggered, thereby improving the speed of starting an application visually.

Figure 4:
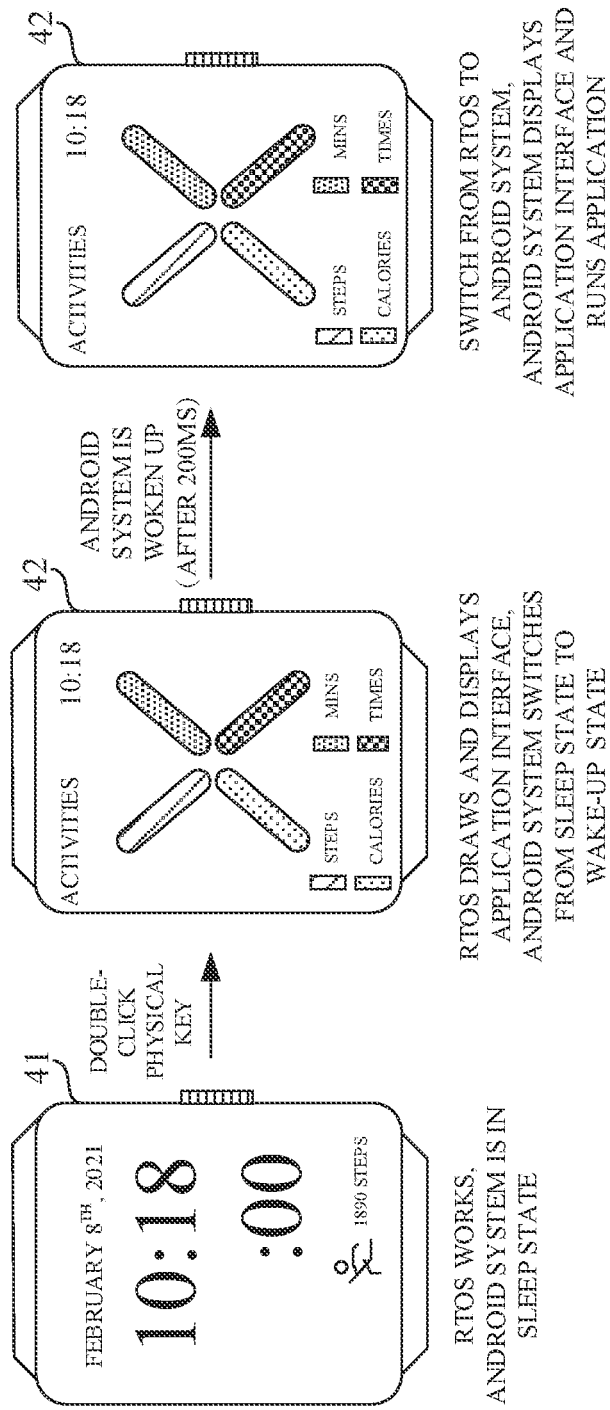
FIG. 4 is a schematic diagram of an interface of an application start-up process in a smartwatch provided in an exemplary embodiment of the present disclosure.

Exemplarily, as illustrated in FIG. 4, taking a wearable device as a smartwatch as an example, the smartwatch is configured with the RTOS (run by the first processor) and the Android system (run by the second processor). The smartwatch displays a watch face 41 by the RTOS, and the Android system is in the sleep state, when the first processor is in the wake-up state and the second processor is in the sleep state, so as to reduce power consumption. The sports application may be quickly started by double-clicking the physical key when the user wants to check motion data via the sports application, and the RTOS draws and displays an application interface 42 of the sports application after receiving a start-up instruction of the sports application.

At block 302, the interface of the target application is drawn by the second system in response to the second system switching from the sleep state to the wake-up state.

In a possible embodiment, while the first system draws and displays the interface, the second system is synchronously woken up, and the second processor switches from the sleep state to the wake-up state. After the second system is switched to the wake-up state, the target application is started and run by the second system. While the target application is started, the second system also needs to draw an interface of the target application.

Optionally, the interface of the target application drawn by the second system is the same as the interface of the target application drawn by the first system, for example, both the second system and the first system draw the first frame of the application interface after the target application is started. Alternatively, the interface of the target application drawn by the second system is different from the interface of the target application drawn by the first system, for example, the interface drawn by the first system is a transition animation during the application starting, and the interface drawn by the second system is the first frame of the application interface after the transition animation is played. Certainly, both the first system and the second system may also draw other interfaces of the target application, and this embodiment does not limit specific interfaces drawn by the first system or specific interfaces drawn by the second system.

Optionally, the first processor wakes up the second processor by sending an interrupt to the second processor.

At block 303, the interface of the target application is displayed by the second system, and the target application is run by the second system, in response to the second system completing drawing the interface.

After the second system completes drawing the interface, a system running in the wearable device is switched from the first system to the second system, the interface of the target application is displayed by the second system, and the target application is run by the second system.

Optionally, after the system is switched to the second system, the first system is still in the wake-up state subsequently (lower power consumption and less impact on the battery life), or the first system is switched to the sleep state, which is not limited in this embodiment.

Exemplarily, as illustrated in FIG. 4, while the RTOS displays the application interface 42, the Android system is switched from the sleep state to the wake-up state. After the Android system is woken up (for example, after 200 ms), a system running in a smartwatch is switched from the RTOS to the Android system, the application interface 42 is displayed by the Android system, and the sports application is run by the Android system.

Optionally, after the second system completes processing events (for example, quitting the target application to return to the watch face), the second processor is switched to the sleep state again, and the first system is switched back to process events. In this way, the wearable device can maintain high performance (but high power consumption) in a few scenarios and low power consumption (but low performance) in most scenarios, which can further reduce the power consumption of the wearable device and extend the battery life of the wearable device.

In conclusion, in embodiments of the present disclosure, for the wearable device supporting dual systems, if the application start-up instruction of the target application is received when the first system is in an on state and the second system is in the sleep state, the interface of the target application is firstly drawn and displayed by the first system. After the second system is woken up, the interface of the target application is displayed by the second system, and the target application is run by the second system. By using solutions according to embodiments of the present disclosure, the first system pre-displays an application start-up effect to improve the speed of starting an application visually and reduce the delay in displaying the application screen during system switching.

Optionally, the interface of the target application is drawn by the first system and displayed by the first system as follows. A target interface resource corresponding to the target application is obtained by the first system from a first storage space, where the first storage space corresponds to the first system. The interface of the target application is drawn by the first system and displayed by the first system based on the target interface resource.

Optionally, the target interface resource corresponding to the target application is obtained by the first system from the first storage space as follows. Target application information of the target application is obtained by the first system. The target interface resource is obtained by the first system from the first storage space based on the target application information.

Optionally, the method further includes the following. An interface-resource update message is sent by the second system to the first system when the second system is in the wake-up state. An interface resource stored in the first storage space is updated by the first system based on the interface-resource update message.

Optionally, the interface-resource update message is sent by the second system to the first system when the second system is in the wake-up state as follows. First-application information of a first application is obtained by the second system in response to receiving a language update broadcast when the second system is in the wake-up state, where a first interface-resource corresponding to the first application is stored in the first storage space. A first-interface-resource update message is sent by the second system to the first system, where the first-interface-resource update message contains the first-application information and an updated first interface-resource.

The interface resource stored in the first storage space is updated by the first system based on the interface-resource update message as follows. The first-application information and the updated first interface-resource are stored by the first system in an associative manner in the first storage space.

Optionally, the first-application information of the first application is obtained by the second system as follows. A query message is sent by the second system to the first system. The first-application information of the first application is sent by the first system to the second system, and the first interface-resource corresponding to the first application is deleted by the first system from the first storage space.

Optionally, the first-application information of the first application is obtained by the second system as follows. The first-application information of the first application is obtained by the second system from a second storage space, where the second storage space corresponds to the second system.

The first-application information and the updated first interface-resource are stored by the first system in an associative manner in the first storage space as follows. The interface resource stored in the first storage space is deleted by the first system in response to identifying that the first-interface-resource update message contains a forced update identifier, and the first-application information and the updated first interface-resource are stored by the first system in an associative manner in the first storage space.

Optionally, the interface-resource update message is sent by the second system to the first system when the second system is in the wake-up state as follows. A second interface-resource and second-application information of the second application are obtained by the second system, in response to monitoring a start-up manner update message of a second application, when the second system is in the wake-up state, and the start-up manner update message is indicative of a change of the start-up manner of the second application. A second-interface-resource update message is sent by the second system to the first system, and the second-interface-resource update message contains an update manner, the second-application information, and the second interface-resource.

The interface resource stored in the first storage space is updated by the first system based on the interface-resource update message as follows. The second interface-resource corresponding to the second-application information in the first storage space is updated by the first system based on the update manner.

Optionally, the second interface-resource corresponding to the second-application information in the first storage space is updated by the first system based on the update manner as follows. The second-application information and the second interface-resource are stored by the first system in an associative manner in the first storage space in response to the update manner being adding. The second-application information and the second interface-resource are deleted by the first system from the first storage space in response to the update manner being deleting.

Optionally, the method further includes the following. An update conflict is determined to exist, in response to the update manner being adding and the second-application information being stored in the first storage space. The update conflict is determined to exist, in response to the update manner being deleting, the second-application information being stored in the first storage space, and the second-application information being used by a start-up manner other than a start-up manner to be deleted. When the update conflict exists, the second interface-resource in the first storage space is not updated.

Optionally, the second interface-resource corresponding to the second-application information in the first storage space is updated by the first system based on the update manner as follows.

The second interface-resource corresponding to the second-application information in the first storage space is updated by the first system based on the update manner, in response to identifying that the second-interface-resource update message does not contain any forced update identifier and there being no update conflict.

The method further includes the following. The second interface-resource corresponding to the second-application information in the first storage space is updated by the first system based on the update manner, in response to identifying that the second-interface-resource update message contains the forced update identifier.

Optionally, the first storage space is configured to store the interface resource corresponding to an application that is started in the first system, where a manner of starting in the first system an application includes at least one of: starting via a shortcut key or starting via a widget of the first system.

Optionally, the interface of the target application is displayed by the second system, and the target application is run by the second system, in response to the second system completing drawing the interface as follows. A switching instruction is sent by the second system to the first system, in response to the second system completing drawing the interface, where the switching instruction is used to instruct the first system to a transfer permission of displaying a graphical user interface (GUI). The interface of the target application is displayed by the second system, and the target application is run by the second system, in response to the second system obtaining the permission of displaying the GUI.

Optionally, the wearable device is configured with the first processor and the second processor, the second processor has power consumption higher than the first processor, the first system is run by the first processor, and the second system is run by the second processor.

In a possible embodiment, the first system corresponds to a data storage space, the second system corresponds to a data storage space, the first system is only responsible for processing simple events, and the second system is configured to process complex events. Therefore, a storage space corresponding to the second system is much larger than a storage space corresponding to the first system. In order to draw and display an interface by the first system, the interface resource corresponding to an application is stored in the storage space corresponding to the first system. After receiving the application start-up instruction, the first system draws the application interface based on the interface resource in the storage space. Exemplary embodiments are described for illustration below.

Figure 5:
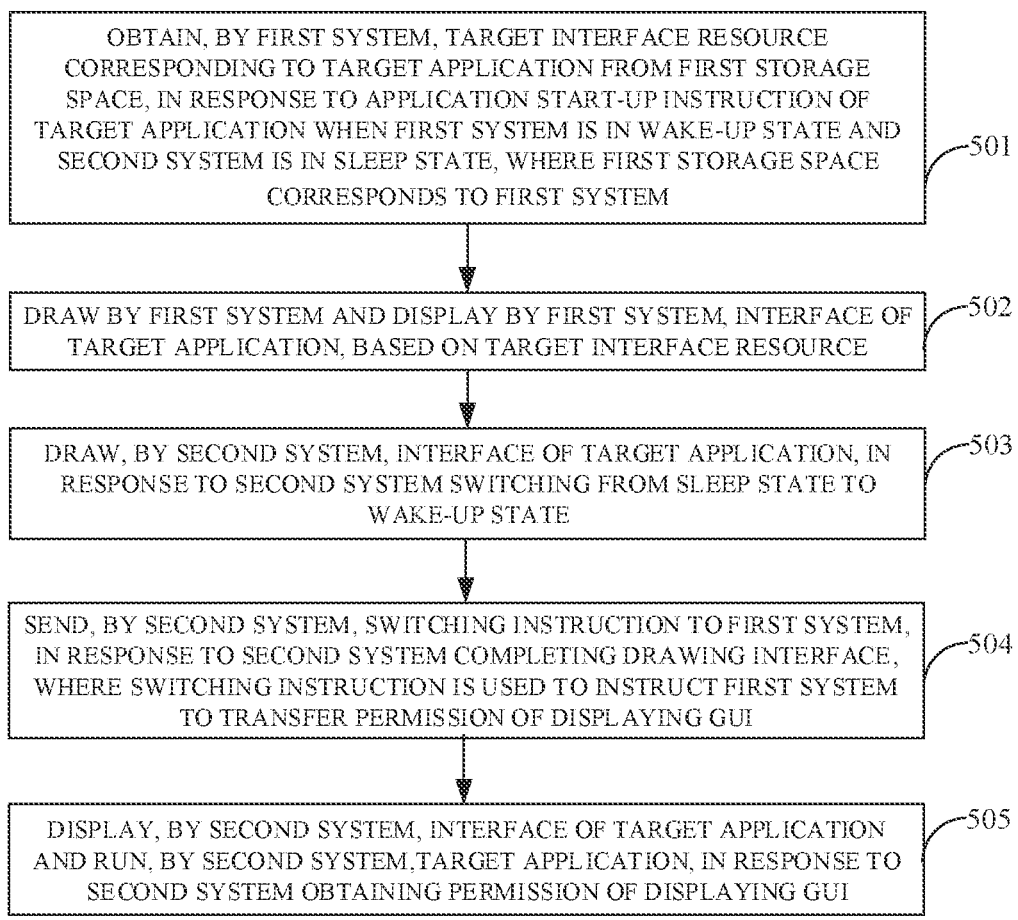
FIG. 5 is a flowchart of a method for displaying an application interface provided in an exemplary embodiment of the present disclosure.

Reference is made to FIG. 5, which is a flowchart of a method for displaying an application interface provided in another exemplary embodiment of the present disclosure. In this embodiment, for illustrative purpose, the method is applicable to a wearable device. The method can include the following.

At block 501, a target interface resource corresponding to a target application is obtained by a first system from a first storage space in response to an application start-up instruction of the target application when the first system is in a wake-up state and a second system is in a sleep state, where the first storage space corresponds to the first system.

In this embodiment of the present disclosure, the first system corresponds to the first storage space, and interface resources corresponding to at least one application are stored in the first storage space. The interface resources are needed for drawing an application interface, the interface resources may include a text resource, a picture resource, an animation resource, a special-effect resource, an interface-layout resource, or the like, and this embodiment does not limit specific contents of the interface resource.

In a possible embodiment, interface resources corresponding to each application in the second system is stored in the first storage space. For example, when a sports application, a health-monitoring application, an alarm application, and an instant messaging application are installed in the second system, interface resources corresponding to each of four installed applications are stored in the first storage space.

The first storage space is limited, and not all applications in the second system are able to be started in the first system (namely, the target application is an application that is able to be started in the first system). Therefore, in another possible embodiment, the first storage space is configured to store an interface resource corresponding to an application that is supported to be started in the first system, so as to reduce a storage space occupied by interface resources while realizing seamless system switching.

Optionally, the application that is supported to be started in the first system refers to an application that is able to be started when the second system is in the sleep state. For example, when the first system is configured with a start-up entry for an application, the application can be started in the first system, and/or when an application is configured to be started via a shortcut key, the application can be started in the first system.

In some embodiments, the manner of starting in the first system an application includes at least one of: starting via a shortcut key or starting via a widget of the first system.

The manner of starting in the first system an application via the shortcut key may be set by the user, for example, double-clicking a physical key to start a specific application, or long-pressing a physical key to start a specific application. The widget may be added by the user in the first system, for example, a widget corresponding to the health-monitoring application is added to the watch face, and the user can tap the widget displayed in the first system to start the health-monitoring application.

For example, when the sports application, the health-monitoring application, the alarm application, and the instant messaging application are installed in the second system, the sports application is able to be started by double-clicking the physical key, and the health-monitoring application is able to be triggered via the widget on the watch face. Therefore, the first storage space only needs to store interface resources corresponding to the sports application and the health-monitoring application, and but not need to store interface resources corresponding to the alarm application and the instant messaging application.

With regard to a specific manner for obtaining the target interface resource corresponding to the target application, in a possible embodiment, the application information and the interface resource are stored in the first storage space in an associative manner. In other words, a mapping relationship between the application information and the interface resource is stored.

Optionally, the application information includes at least one of a package name or an activity name. When the application only has one function interface, the application information includes the package name. When the application has multiple function interfaces and a specific function interface can be set to be started and displayed in the first system, the application information includes the package name and the activity name (which corresponds to the specific function interface).

Correspondingly, after the application start-up instruction of the target application is received, the target application information of the target application is obtained by the first system, the target interface resource is obtained by the first system from the first storage space based on the target application information, where the target application information includes at least one of a target package name or a target activity name.

In some embodiments, the first system searches for, based on the target application information, the interface resource matching the target application information in the first storage space, and determines the found interface resource as the target interface resource corresponding to the target application.

In an exemplary example, the mapping relationship between the application information and the interface resource in the first storage space is illustrated in Table 1.

TABLE 1

| Application Information | Interface Resource |
|---|---|
| Package Name: sport_app | Interface Resource File A |
| Package Name: health_app | Interface Resource File B |

When the package name of the target application is obtained as sport_app, the first system determines an interface resource file A in the first storage space as the target interface resource. When the package name of the target application is obtained as health_app, the first system determines an interface resource file B in the first storage space as the target interface resource.

At block 502, an interface of the target application is drawn by the first system and displayed by the first system based on the target interface resource.

Further, after obtaining the target interface resource, the first system immediately carries out real-time drawing and display of the interface.

Optionally, while the first system draws the interface, the first system needs the target interface resource and other data such as time data, sensor data (for example, pedometer data), or the like, thereby ensuring an accuracy of content in a drawn interface.

In an exemplary embodiment, the target interface resource corresponding to the sports application obtained by the first system includes the picture resource, the text resource, and the interface-layout resource. The first system draws the picture resource and the text resource at corresponding interface positions based on an interface-element layout manner indicated by the interface-layout resource, and renders a current time and the pedometer data in the interface to obtain the application interface of the sports application.

At block 503, the interface of the target application is drawn by the second system in response to the second system switching from the sleep state to the wake-up state.

For implementation of this block, reference may be made to block 302, and details are not repeatedly described herein in this embodiment.

At block 504, a switching instruction is sent by the second system to the first system in response to the second system completing drawing the interface, where the switching instruction is used to instruct the first system to transfer a permission of displaying a GUI.

In order to ensure normal use of the target application, the first system needs to transfer the permission of displaying the GUI to the second system during system switching, so that the wearable device displays the GUI of the second system during running of the target application. In a possible embodiment, after completing drawing the interface, the second system sends the switching instruction to the first system to instruct the first system to transfer the permission of displaying the GUI to the second system.

At block 505, the interface of the target application is displayed by the second system, and the target application is run by the second system, in response to the second system obtaining the permission of displaying the GUI.

After obtaining the permission of displaying the GUI, the second system displays the drawn interface of the target application and runs the target application, and correspondingly, the wearable device displays the interface of the target application.

In this embodiment, the application information and the interface resource are stored in the first storage space, so that the first system can accurately obtain the corresponding target interface resource from the first storage space based on the target application information of the target application after receiving the application start-up instruction, thereby improving the speed and accuracy of drawing the interface.

Furthermore, the first storage space only stores the interface resource of the application that is supported to be started in the first system, so as to reduce the storage space occupied by the interface resource and lower the demand for the capacity of the first storage space while realizing seamless system switching.

In the foregoing embodiment, the interface of the application in the wearable device does not remain unchanged, and the application that is able to be started in the first system may also change. Therefore, the interface resource stored in the first storage space also needs to be updated correspondingly to ensure the accuracy of the application interface displayed during the application starting. In a possible embodiment, when the second system is in the wake-up state, the wearable device sends by the second system the interface-resource update message (when an interface-resource update event exists) to the first system, and the first system updates the interface resource stored in the first storage space based on the interface-resource update message. The interface-resource update message at least includes application information of an application to be updated.

Figure 6:
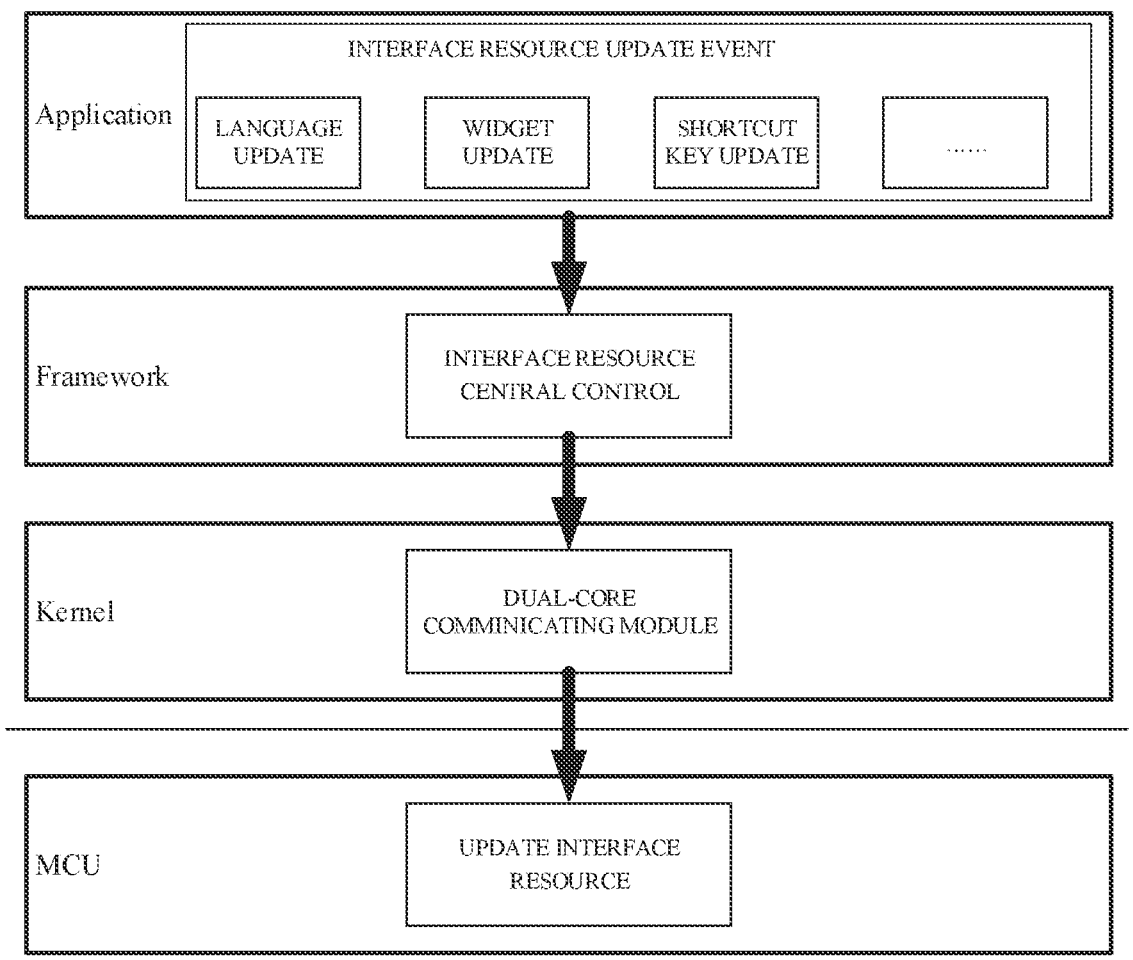
FIG. 6 is a schematic diagram illustrating an interface-resource update process provided in an exemplary embodiment of the present disclosure.

Taking the first system as the RTOS run by the MCU and the second system as the Android system run by the CPU as an example, as illustrated in FIG. 6, when an interface-resource update event (including events such as language update, widget update, shortcut key update, or the like) exists in an application layer, the application layer pre-sets the updated interface resource to a framework resource Android application package (APK) corresponding to the Android system.

An interface-resource management central control in a framework layer is responsible for monitoring the interface-resource update event. When monitoring the interface-resource update event, the interface-resource management central control obtains the interface resource from the framework resource APK, and communicates with the MCU via a dual-core communication module in a kernel layer (specifically disposed in the DCC of the kernel layer), so that the MCU updates, based on interface-resource update data received, the interface resource stored in the first storage space.

For different update scenarios, processes of updating interface resources through interaction between the second system and the first system are also different. When a system-level interface-resource update event exists, the first system needs to update all interface resources stored in the first storage space. When an application-level interface-resource update event exists, the first system only needs to update an interface resource of a specific application. The interface-resource update process in different update scenarios will be described below correspondingly with embodiments.

Figure 7:
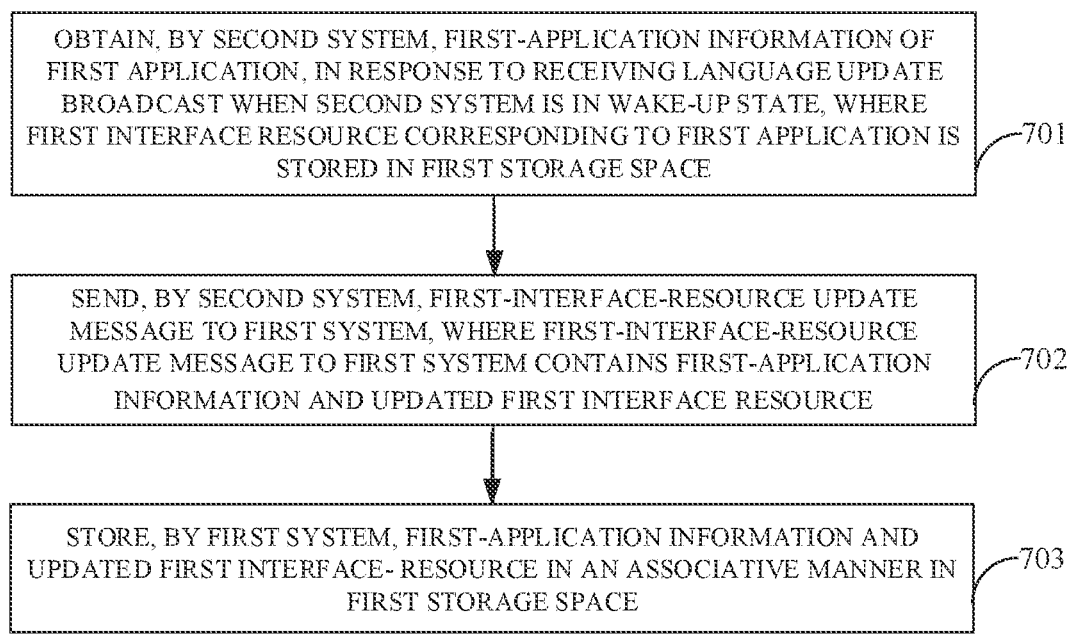
FIG. 7 is a flowchart of an interface-resource update process provided in an exemplary embodiment of the present disclosure.

Reference is made to FIG. 7, which is a flowchart of an interface-resource update process provided in an exemplary embodiment of the present disclosure. In this embodiment, for example, the method is applicable to the wearable device. The method can include the following.

At block 701, the first-application information of the first application is obtained by the second system in response to receiving the language update broadcast when the second system is in the wake-up state, where the first interface-resource corresponding to the first application is stored in the first storage space.

In a possible embodiment, when a system language of the wearable device changes, the second system receives the language update broadcast which includes a switched system language. For example, the second system receives the language update broadcast indicating switching the system language to English when the user switches the system language of the wearable device from Chinese to English.

When the system language is changed, the application language of all applications in the second system needs to be changed, and content (for example, text content) in application interfaces also changes correspondingly. Therefore, after receiving the language update broadcast, the second system determines that interface resources of all applications need to be updated, and obtains the first-application information of the first application in the first storage space.

With regard to a method for obtaining the first-application information, in a possible embodiment, a mapping relationship between the first-application information and the first interface-resource is stored in the first storage space, and the second system can obtain the first-application information by the first system. Optionally, operations at this block may include the following operations.

A query message is sent by the second system to the first system.

Optionally, the second system sends, via the dual-core communication module of the kernel layer, the query message to the first system, to request the first system to query the first-application information stored in the first storage space. Correspondingly, the first system obtains the stored first-application information from the first storage space after receiving the query message.

Figure 8:
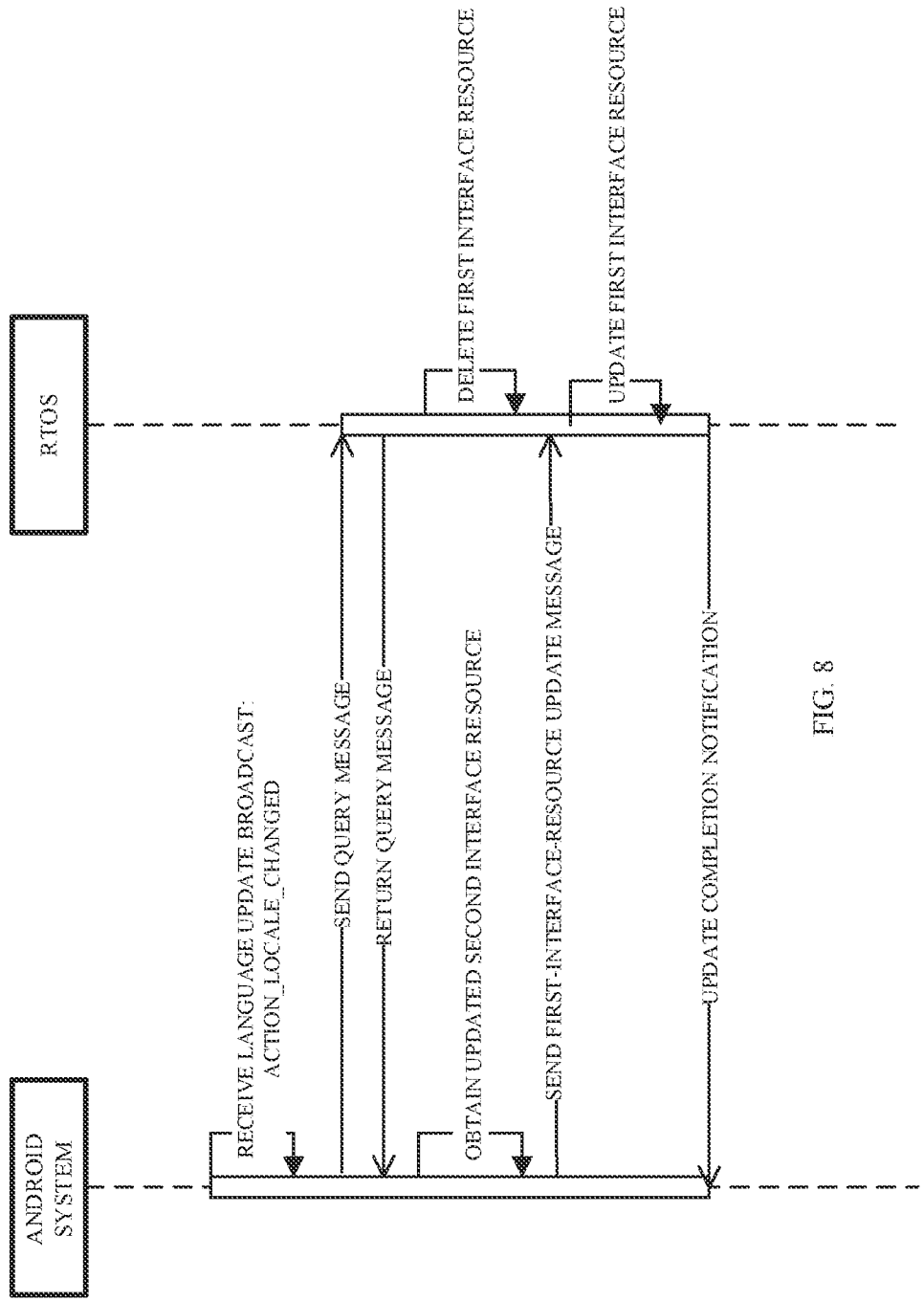
FIG. 8 is a sequence diagram of a system interaction of an interface-resource update process provided in an exemplary embodiment of the present disclosure.

Exemplarily, as illustrated in FIG. 8, the Android system sends the query message to the RTOS when receiving the language update broadcast (ACTION_LOCALE_CHANGED) in the wake-up state.

The first-application information of the first application is sent, by the first system, to the second system, and the first interface-resource corresponding to the first application is deleted, by the first system, from the first storage space.

Optionally, the first system sends, via the dual-core communication module of the kernel layer, a query result including the first-application information to the second system after querying the first-application information of each first application.

With reference to the data illustrated in Table 1 in the foregoing embodiment, the query result reported by the first system to the second system includes the package name, sport_app and health_app.

An originally stored interface resource is invalid after the system language is updated. Therefore, in a possible embodiment, the first system deletes the first interface-resource corresponding to the first application from the first storage space, to release the first storage space and ensure the accuracy of subsequent interface resource updates.

Optionally, the query message sent by the second system contains a pre-set identifier. The first system determines that the interface resource needs to be updated because of a change in the system language when the query message is identified to contain the pre-set identifier, and deletes the first interface-resource stored in the first storage space. With reference to the data illustrated in Table 1 in the foregoing embodiment, the first system deletes the interface resource file A and the interface resource file B that are stored in the first storage space.

Exemplarily, as illustrated in FIG. 8, the RTOS deletes the first interface-resource stored in the first storage space while feeding back the query result to the Android system.

At block 702, a first-interface-resource update message is sent by the second system to the first system, where the first-interface-resource update message contains the first-application information and the updated first interface-resource.

In a possible embodiment, the second system obtains, based on the first-application information, the updated first interface-resource corresponding to the first application stored in the second storage space. The second storage space corresponds to the second system, and the updated first interface-resource is stored by each first application in the second storage space. For example, the interface-resource management center control in the second system obtains the updated first interface-resource from the framework resource APK.

With reference to the example in the foregoing block, the second system obtains, based on the package name sport_app and the health_app, an updated interface resource file A' and an updated interface resource file B'.

Optionally, the text resource in the first interface-resource after the update is different from the text resource in the first interface-resource before the update. For example, the text resource after the update is an English version of the first application, and the text resource before the update is a Chinese version of the first application.

Further, the second system sends, via the dual-core communication module, the first-interface-resource update message to the first system, so that the first system updates the interface resource in the first storage space.

In a possible embodiment, the first-interface-resource update message may contain the following fields.

Path, is indicative of an update path. In this embodiment, a value of a path field is indicative of a system language update triggering an interface resource update.

Action, is indicative of an update manner of the interface resource. In this embodiment, a value of an action field is indicative of replacing the interface resource.

Packagename, is indicative of the package name.

Data, is indicative of the updated interface resource.

Extra, is indicative of whether to mandatorily update the interface resource. In this embodiment, a value of an extra field is indicative of mandatorily updating the interface resource.

It should be noted that, the first-interface-resource update message may further contain other fields, and this embodiment is described schematically only by taking the foregoing fields as examples, which, however, shall not be construed as a limitation thereon.

Exemplarily, as illustrated in FIG. 8, the Android system, after receiving the query result, obtains the updated first interface-resource based on the query result and sends the first-interface-resource update message to the RTOS based on the first interface-resource.

At block 703, the first-application information and the updated first interface-resource are stored by the first system in an associative manner in the first storage space.

The first system stores the first-application information and the updated first interface-resource in an associative manner after receiving the first-interface-resource update message. The first system may draw and display the application interface based on the updated interface resource during subsequent system switching, so as to ensure that a language used by the displayed application interface is consistent with the system language.

With reference to the example in the foregoing operations, the mapping relationship between the application information and the interface resource in the first storage space is as illustrated in Table 2 after the first system updates the interface resource based on the first-interface-resource update message.

TABLE 2

| Application Information | Interface Resource |
| --- | --- |
| Package Name: sport_app | Interface Resource File A' |
| Package Name: health_app | Interface Resource File B' |

Optionally, the first system sends to the second system an update completion notification after completing updating the interface resource, informing the second system that update of the interface resource has been completed. If the second system does not receive the update completion notification within a preset duration, the second system sends the first-interface-resource update message to the first system again.

Exemplarily, as illustrated in FIG. 8, the RTOS sends the update completion notification to the Android system after updating the first interface-resource.

In addition to obtaining the first-application information from the first system, in another possible embodiment, the wearable device may further obtain, by the second system, the first-application information of the first application from the second storage space and set a forced update identifier in the first-interface-resource update message sent to the first system because each application stores the updated interface resource in (the second storage space of) the second system.

Correspondingly, when the first system identifies that the first-interface-resource update message contains the forced update identifier (for example, set in the extra field in the first interface-resource update message), the first system deletes the interface resource stored in the first storage space, and stores the first-application information and the updated first interface-resource in the first storage space in an associative manner, so as to avoid storing two sets of interface resources of the same application.

In this embodiment, when the system language is updated, the first-application information of each first application is obtained by the second system, the updated first interface-resource is obtained based on the first-application information by the second system, and the updated first interface-resource is sent by the second system to the first system. The first system updates the first interface-resource stored in the first storage space, so as to ensure that an application interface language displayed in the first system is consistent with the system language during subsequent system switching.

Figure 9:
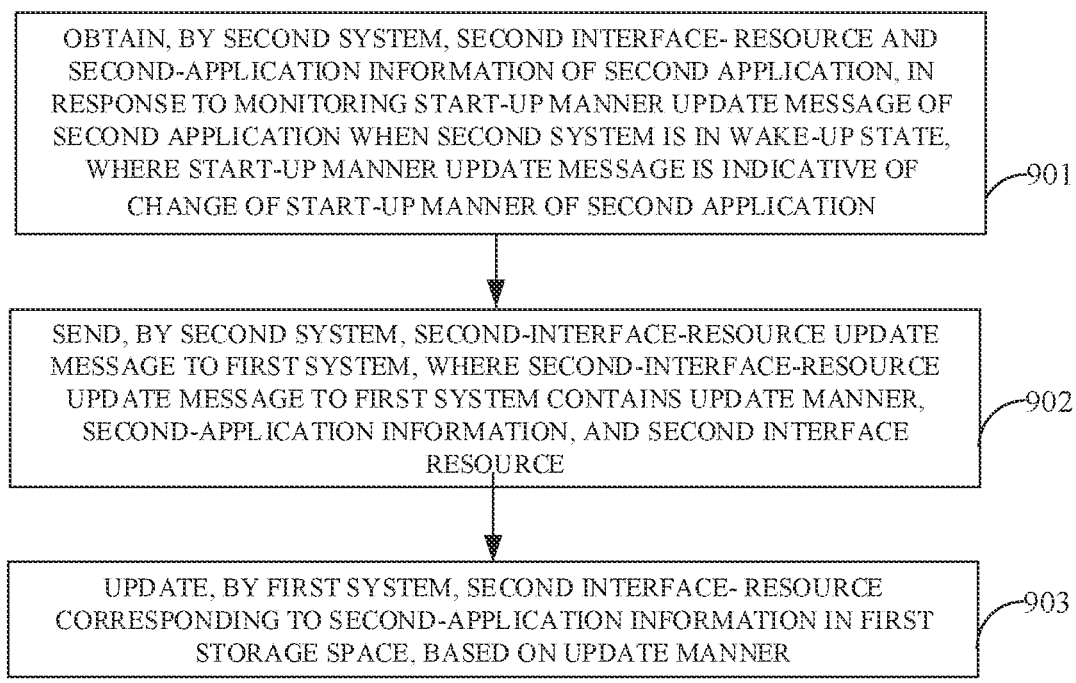
FIG. 9 is a flowchart of an interface-resource update process according to another exemplary embodiment of the present disclosure.

Reference is made to FIG. 9, which is a flowchart of an interface-resource update process provided in another exemplary embodiment of the present disclosure. In this embodiment, for illustrative purpose, the method is applicable to the wearable device. The method can include the following operations.

At block 901, the second interface-resource and second-application information of the second application are obtained by the second system in response to monitoring the start-up manner update message for the second application when the second system is in the wake-up state, where the start-up manner update message is indicative of the change of the start-up manner of the second application.

In order to improve the efficiency of starting an application, the user may set a quick start-up manner for the application in the second system, so that the application in the second system can also be started by the first system. Setting the quick start-up manner may include adding a widget of an application to the first system and setting a shortcut key for starting an application.

Correspondingly, the first system needs to adaptively update the interface resource in the first storage space, when the start-up manner of the second application is updated (for example, a quick start-up manner is added or the quick start-up manner is deleted).

In a possible embodiment, the second system monitors a start-up manner change message when the start-up manner of the second application in the second system changes. The start-up manner change message may include a target start-up manner and an update manner corresponding to the target start-up manner.

For example, when the second application is set with a start-up manner of the widget, the target start-up manner is a widget start-up, and the update manner is adding. When the second application is set with a start-up manner of the shortcut key being deleted, the target start-up manner is a shortcut key start-up, and the update manner is deleting.

Further, the second system obtains the second interface-resource and the second-application information of the second application. The second system may obtain the second interface-resource from the second storage space based on the application information of the second application in the start-up manner update message.

Optionally, when the update manner indicated by the start-up manner update message is adding, the second system obtains the second-application information and the second interface-resource. When the update manner indicated by the start-up manner update message is deleting, the second system only needs to obtain the second-application information.

Figure 10:
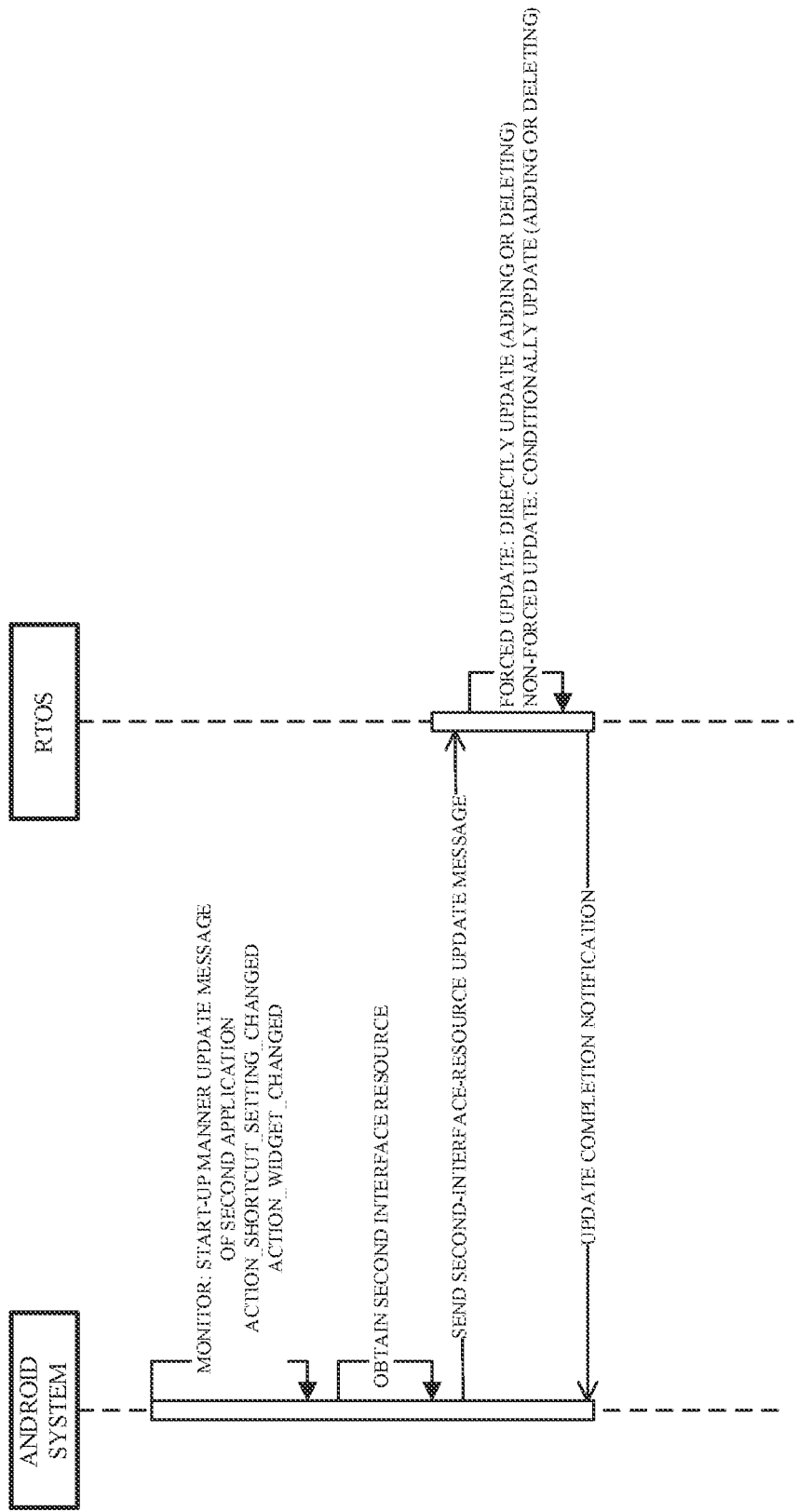
FIG. 10 is a sequence diagram of a system interaction during an interface-resource update process according to another exemplary embodiment of the present disclosure.

Exemplarily, as illustrated in FIG. 10, the Android system obtains the second interface-resource of the second application when monitoring the start-up manner update message (including ACTION_SHORTCUT_SETTING_CHANGED and ACTION_WIDGET_CHANGED) of the second application.

At block 902, the second-interface-resource update message is sent by the second system to the first system, and the second-interface-resource update message contains the update manner, the second-application information, and the second interface-resource.

The second system sends, via the dual-core communication module, the second-interface-resource update message to the first system based on the obtained second interface-resource. The second-interface-resource update message not only contains the second-application information and the second interface-resource, but also contains the target start-up manner and the update manner.

In a possible embodiment, the second-interface-resource update message may include the following fields.

Path, is indicative of the update path. In this embodiment, the value of the path field is indicative that an update of a quick start-up manner (including updating the widget and updating the shortcut key) triggering the update of the interface resource.

Action, is indicative of the update manner of the interface resource. In this embodiment, the value of the action field is indicative of adding the interface resource or deleting the interface resource.

Packagename, is indicative of the package name.

Activityname, is indicative of the activity name for indicating a specific application interface of the application.

Data, is indicative of the updated interface resource.

Extra, is indicative of whether to mandatorily update the interface resource.

It should be noted that, the second-interface-resource update message may further contain other fields, and this embodiment is described schematically only by taking the foregoing fields as an example, which, however, shall not be construed as a limitation thereon.

Exemplarily, as illustrated in FIG. 10, after the Android system obtains the second interface-resource, the Android system sends the second-interface-resource update message to the RTOS to instruct the RTOS to update the interface resource stored in the first storage space.

At block 903, the second interface-resource corresponding to the second-application information in the first storage space is updated by the first system based on the update manner.

In a possible embodiment, the first system updates, based on the obtained second-interface-resource update message, the second interface-resource corresponding to the second-application information in the first storage space.

With regard to a specific manner for updating the interface resource, in some embodiments, the wearable device stores, by the first system, the second-application information and the second interface-resource in an associative manner in the first storage space in response to the update manner being adding; and the wearable device deletes, by the first system, the second-application information and the second interface-resource from the first storage space in response to the update manner being deleting.

In a possible application scenario, when the second interface-resource of the second application is stored in the first storage space, the update conflict may be triggered if the interface resource is updated directly based on the second-interface-resource update message.

For example, when the second interface-resource of the second application is stored in the first storage space, if the second-interface-resource update message indicates to add the second interface-resource of the second application (corresponding to different quick start-up manners), directly adding the second interface-resource to the first storage space may cause repeated storage of the interface resource, resulting in a waste of the storage space.

For another example, when the second interface-resource of the second application is stored in the first storage space, and the second application is able to be started via at least two different quick start-up manners, if the second-interface-resource update message indicates to delete the second interface-resource of the second application (deleting one of the quick start-up manners), directly deleting the second interface-resource from the first storage space may cause that the second application can only be started via other quick start-up manners, and the first system cannot draw and display the application interface.

Therefore, in a possible embodiment, the first system carries out an update conflict detection based on the update manner and the second-application information after receiving the second-interface-resource update message. If the update conflict does not exist, the first system updates the interface resource in the first storage space based on the update manner indicated by the second-interface-resource update message. If the update conflict exists, the first system does not respond to the second-interface-resource update message.

With regard to a specific manner for detecting whether the update conflict exists, in a possible embodiment, the first system detects whether the second-application information exists in the first storage space when the update manner is adding (adding the second interface-resource). If the second-application information does not exist in the first storage space, the update conflict is determined to not exist, and the second-application information and the second interface-resource can be stored in the first storage space in an associative manner.

In an exemplary embodiment, when the mapping relationship between the application information and the interface resource in the first storage space is illustrated in Table 1, if the second-interface-resource update message contains the update manner as adding and the second-application information as "package name: alarm_app" (alarm application), it is determined that the update conflict does not exist since the second-application information does not exist in the first storage space, and the interface resource is updated. The mapping relationship between the application information and the interface resource in the first storage space is illustrated in Table 3 after the interface resource is updated.

TABLE 3

| Application Information | Interface Resource |
| --- | --- |
| Package Name: sport_app | Interface Resource File A |
| Package Name: health_app | Interface Resource File B |
| Package Name: alarm_app | Interface Resource File C |

Optionally, the first system determines that the update conflict exists and does not update the second interface-resource in the first storage space in response to the update manner being adding and the second-application information being stored in the first storage space.

Optionally, the first system adds, to the second-application information, a corresponding start-up manner to be added if the first system determines that the update conflict exists when the update manner is adding.

For example, with reference to the data illustrated in Table 3, if the second-interface-resource update message contains the update manner as adding and the second-application information as "package name: sport_app", it is determined that the update conflict exists since the second-application information exists in the first storage space, the interface resource file A is not updated, and only the "shortcut key" of the target start-up manner in the second-interface-resource update message is added to the sport_app.

In another possible embodiment, the first system detects, based on the target start-up manner (namely, a start-up manner to be deleted) in the second-interface-resource update message, whether the second-application information stored in the first storage space is used by a start-up manner other than a start-up manner to be deleted, when the update manner is deleting (deleting the second interface-resource). If the second-application information stored in the first storage space is not used by the start-up manner other than the start-up manner to be deleted (namely, the second application is started only via the shortcut indicated by the start-up manner to be deleted), the first system determines that the update conflict does not exist, and the first system deletes the second-application information and the second interface-resource from the first storage space.

In an exemplary embodiment, the mapping relationship among the application information, the interface resource, and the start-up manner in the first storage space is illustrated in Table 4.

TABLE 4

| Application Information | Interface Resource | Start-up Manner |
| --- | --- | --- |
| Package Name: sport_app | Interface Resource File A | Widge, Shortcut Key |
| Package Name: health_app | Interface Resource File B | Shortcut Key |

If the second-interface-resource update message contains the update manner as deleting, the second-application information as "application package name: health_app", and the start-up manner to be deleted as "shortcut key", the first system determines that the update conflict does not exist and updates the interface resource. The mapping relationship among the application information, the interface resource, and the start-up manner in the first storage space is illustrated in Table 5 after the interface resource is updated.

TABLE 5

| Application Information | Interface Resource | Start-up Manner |
| --- | --- | --- |
| Package Name: sport_app | Interface Resource File A | Widge, Shortcut Key |

Optionally, the first system determines that the update conflict exists and does not update the second interface-resource in the first storage space, in response to the update manner being deleting, the second-application information being stored in the first storage space, and the second-application information being used by a start-up manner other than the start-up manner to be deleted.

Optionally, when the update manner is deleting, the first system deletes, for the second-application information, a corresponding start-up manner to be deleted if the first system determines that the update conflict exists.

For example, in combination with the data illustrated in Table 4, if the second-interface-resource update message contains the update manner as deleting and the second-application information as "package name: health_app", the update conflict is determined to exist since the second-application information exists in the first storage space, the interface resource file A is not updated, and only the "shortcut key" of the start-up manner to be deleted in the second-interface-resource update message is deleted for the health_app.

In a possible embodiment, the second system can set the forced update identifier in the second-interface-resource update message to instruct the first system to mandatorily update the second interface-resource.

Optionally, the first system carries out the update conflict detection based on the update manner and the second-application information, in response to identifying that the second-interface-resource update message does not contain any forced update identifier. The first system updates the second interface-resource corresponding to the second-application information in the first storage space based on the update manner, in response to identifying that the second-interface-resource update message contains the forced update identifier.

Optionally, the first system sends to the second system an update completion notification after completing updating the interface resource, informing the second system that update of the interface resource has been completed. If the second system does not receive the update completion notification within a preset duration, the second system sends the second-interface-resource update message to the first system again.

Exemplarily, as illustrated in FIG. 10, after the RTOS receives the second-interface-resource update message, the RTOS system directly updates (adds or deletes) the interface resource if the second-interface-resource update message contains the forced update identifier; or if the second-interface-resource update message does not contain the forced update identifier, the RTOS system conditionally (when the update conflict does not exist) updates (adds or deletes) the interface resource and sends the update completion notification to the Android system after completing updating the second interface-resource.

In this embodiment, when the start-up manner of the second application is updated, the second-application information of the second application is obtained by the second system, the second interface-resource is obtained based on the second-application information, and the second-interface-resource update message is sent to the first system. The first system determines whether the update conflict exists in the second interface-resource. The second interface-resource is updated if the update conflict does not exist, or the second interface-resource is not updated if the update conflict exists, so as to ensure the normal running of the function of seamless system switching after the start-up manner is updated.

It should be noted that, in the foregoing embodiments, only a process of displaying an application interface under a dual-core dual-system device is taken as an example for description. In other possible application scenarios, a single-core dual-system (for example, a processor running different systems on different cores) device may also use solutions according to embodiments of the present disclosure to realize displaying the application interface during system switching, which is not described in detail in this embodiment.

Figure 11:
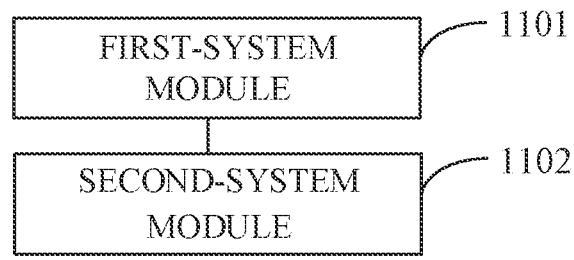
FIG. 11 is a structural block diagram of an apparatus for displaying an application interface provided in another embodiment of the present disclosure.

Referring to FIG. 11, FIG. 11 is a structural block diagram of an apparatus for displaying an application interface provided in another embodiment of the present disclosure. The apparatus can be implemented as all or part of a wearable device by software, hardware, or a combination of both. The apparatus includes a first-system module 1101 and a second-system module 1102.

The first-system module 1101 is configured to draw by a first system and display by the first system, an interface of a target application in response to an application start-up instruction of the target application when the first system is in a wake-up state and the second system is in a sleep state.

The second-system module 1102 is configured to draw, by a second system, the interface of the target application in response to the second system switching from the sleep state to the wake-up state.

The second-system module 1102 is further configured to display, by the second system, the interface of the target application and run, by the second system, the target application, in response to the second system completing drawing the interface.

Optionally, the first-system module 1101 is configured to: obtain, by the first system, a target interface resource corresponding to the target application from a first storage space, and the first storage space corresponds to the first system; and draw by the first system and display by the first system, the interface of the target application based on the target interface resource.

Optionally, the first-system module 1101 is specifically configured to obtain, by the first system, target application information of the target application; and obtain, by the first system, the target interface resource from the first storage space based on the target application information.

Optionally, the second-system module 1102 is further configured to send, by the second system, an interface-resource update message to the first system when the second system is in the wake-up state. The first-system module 1101 is further configured to update, by the first system, an interface resource stored in the first storage space based on the interface-resource update message.

Optionally, the second-system module 1102 is specifically configured to obtain, by the second system, first-application information of a first application in response to receiving a language update broadcast when the second system is in the wake-up state, where a first interface-resource corresponding to the first application is stored in the first storage space; and send, by the second system, a first-interface-resource update message to the first system, wherein the first-interface-resource update message contains the first-application information and an updated first interface-resource. The first-system module 1101 is specifically configured to store, by the first system, the first-application information and the updated first interface-resource in an associative manner in the first storage space.

Optionally, the second-system module 1102 is specifically configured to send, by the second system, a query message to the first system. The first-system module 1101 is specifically configured to send, by the first system, the first-application information of the first application to the second system and delete, by the first system, the first interface-resource corresponding to the first application from the first storage space.

Optionally, the second-system module 1102 is specifically configured to obtain, by the second system, the first-application information of the first application from a second storage space, and the second storage space corresponds to the second system. The first-system module 1101 is specifically configured to delete, by the first system, the interface resource stored in the first storage space in response to identifying that the first-interface-resource update message contains a forced update identifier and store, by the first system, the first-application information and the updated first interface-resource in an associative manner in the first storage space.

Optionally, the second-system module 1102 is specifically configured to obtain, by the second system, a second interface-resource and second-application information of a second application in response to monitoring a start-up manner update message of the second application when the second system is in the wake-up state, and the start-up manner update message is indicative of a change of the start-up manner of the second application; and send, by the second system, a second-interface-resource update message to the first system, and the second-interface-resource update message contains an update manner, the second-application information, and the second interface-resource. The first-system module 1101 is specifically configured to update, by the first system, the second interface-resource corresponding to the second-application information in the first storage space based on the update manner.

Optionally, the first-system module 1101 is specifically configured to store, by the first system, the second-application information and the second interface-resource in an associative manner in the first storage space in response to the update manner being adding; and delete, by the first system, the second-application information and the second interface-resource from the first storage space in response to the update manner being deleting.

Optionally, the first-system module 1101 is further configured to determine that an update conflict exists in response to the update manner being adding and the second-application information being stored in the first storage space; and determine that the update conflict exists in response to the update manner being deleting, the second-application information being stored in the first storage space, and the second-application information being used by a start-up manner other than a start-up manner to be deleted, where when the update conflict exists, the second interface-resource in the first storage space is not updated.

Optionally, the first-system module 1101 is further configured to update, by the first system, the second interface-resource corresponding to the second-application information in the first storage space based on the update manner, in response to identifying that the second-interface-resource update message does not contain any forced update identifier and the update conflict does not exist; and update, by the first system, the second interface-resource corresponding to the second-application information in the first storage space based on the update manner, in response to identifying that the second-interface-resource update message contains the forced update identifier.

Optionally, the first storage space is configured to store the interface resource corresponding to an application that is started in the first system, where a manner of starting in the first system an application includes at least one of: starting via a shortcut key or starting via a widget of the first system.

Optionally, the second-system module 1102 is further configured to: send, by the second system, a switching instruction to the first system, in response to the second system completing drawing the interface, and the switching instruction is used to instruct the first system to transfer the permission of displaying the GUI; and display, by the second system, the interface of the target application and running, by the second system, the target application, in response to the second system obtaining the permission of displaying the GUI.

Optionally, the wearable device is configured with a first processor and a second processor, the second processor has power consumption higher than the first processor, the first system is run by the first processor, and the second system is run by the second processor.

In conclusion, in embodiments of the present disclosure, for the wearable device supporting dual systems, if the application start-up instruction of the target application is received when the first system is in an on state and the second system is in the sleep state, the interface of the target application is firstly drawn and displayed by the first system. After the second system is woken up, the interface of the target application is displayed by the second system, and the target application is run by the second system. By using solutions according to embodiments of the present disclosure, the first system pre-displays an application start-up effect to improve the speed of starting an application visually and reduce the delay in displaying the application screen during system switching.

In this embodiment, the application information and the interface resource are stored in the first storage space, so that the first system can accurately obtain the corresponding target interface resource from the first storage space based on the target application information of the target application after receiving the application start-up instruction, thereby improve the speed of drawing the interface and the accuracy of drawing the interface.

Furthermore, the first storage space only stores the interface resource of the application that is able to be started in the first system, so as to reduce the storage space occupied by the interface resource and lower the demand for the capacity of the first storage space while realizing seamless system switching.

In this embodiment, when the system language is updated, the first-application information of each first application is obtained by the second system, the updated first interface-resource is obtained based on the first-application information, and the updated first interface-resource is sent to the first system. The first system updates the first interface-resource stored in the first storage space, so as to ensure that an application interface language displayed in the first system is consistent with the system language during subsequent system switching.

In this embodiment, when the start-up manner of the second application is updated, the second-application information of the second application is obtained by the second system, the second interface-resource is obtained based on the second-application information, and the second-interface-resource update message is sent to the first system. The first system determines whether the update conflict exists in the second interface-resource. The second interface-resource is updated if the update conflict does not exist, or the second interface-resource is not updated if the update conflict exists, so as to ensure the normal running of the function of seamless system switching after the start-up manner is updated.

In this embodiment, the device is presented in the form of modules. "Module" herein can refer to an application-specific integrated circuit (ASIC), a processor and a memory for executing one or more software or firmware programs, an integrated logic circuit, and/or other components that can achieve the above described functions.

Figure 12:
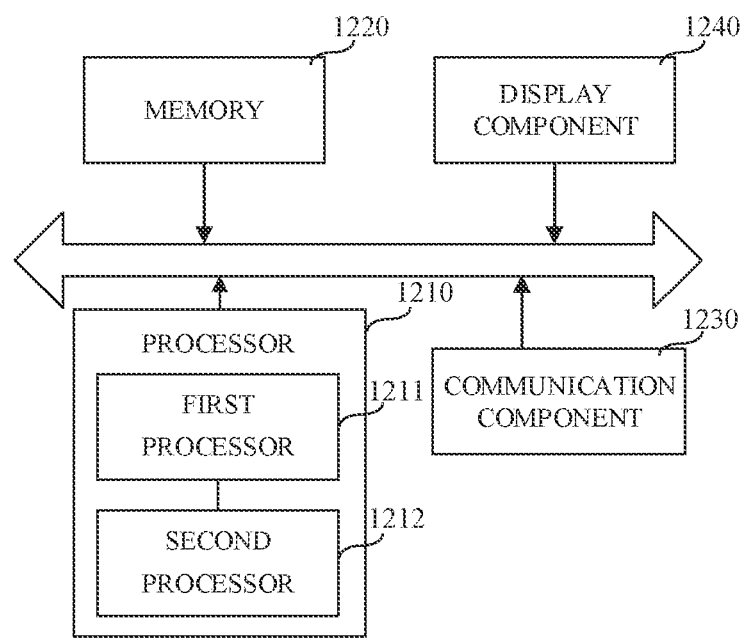
FIG. 12 is a structural block diagram of a wearable device provided in an exemplary embodiment of the present disclosure.

Referring to FIG. 12, FIG. 12 is a structural block diagram of the wearable device provided in an exemplary embodiment of the present disclosure. The wearable device in the present disclosure may include one or more of the following components: a processor 1210 and a memory 1220.

Optionally, the processor 1210 at least includes a first processor 1211 and a second processor 1212. The first processor 1211 is configured to run the first system, and the second processor 1212 is configured to run the second system. The first processor 1211 has power consumption lower than the second processor 1212, and the first processor 1211 has a performance lower than the second processor 1212. The processor 1210 is configured to connect to each part of the whole electronic device via various interfaces and lines, to execute various functions of the electronic device and process data by running or executing an instruction, a program, a code set, or an instruction set that are all stored in the memory 1220 and invoking data stored in the memory 1220. Optionally, the processor 1210 may be implemented by using at least one hardware form of a digital signal processing (DSP), a field-programmable gate array (FPGA), or a programmable logic array (PLA). The processor 1210 may integrate one or any combination of a CPU, a graphic processing unit (GPU), a neural-network processing unit (NPU), a modem, or the like. The CPU is mainly configured to process an operating system, a UI, an application program, or the like. The GPU is configured to render and draw content required to be displayed on the TP. The NPU is configured to realize an artificial intelligence (AI) function. The modem is configured to process wireless communication. It should be understood that the modem may also not be integrated into the processor 1210 and may be implemented via a chip separately.

The memory 1220 may include the RAM or the ROM. Optionally, the memory 1220 may include a non-transitory computer-readable storage medium. The memory 1220 is configured to store an instruction, a program, a code, a code set, or an instruction set. The memory 1220 may include a program storage area and a data storage area. The program storage area is configured to store instructions for implementing the operating system, instructions for implementing at least one function (such as a touch control function, a sound playing function, an image playing function, or the like), instructions for implementing the above embodiments, or the like. The data storage area is configured to store data (such as audio data, phonebooks, or the like) created according to the usage of the wearable device.

The wearable device in embodiments of the present disclosure further includes a communication component 1230 and a display component 1240. The communication component 1230 may be a Bluetooth component, a wireless fidelity (Wi-Fi) component, a near field communication (NFC) component, or the like, and is configured to communicate with an external device (a server or other terminal devices) via a wired network or a wireless network. The display component 1240 is configured to display the GUI and/or receive a user interaction operation.

In addition, those skilled in the art can understand that the structure of the wearable device illustrated in the foregoing figures does not constitute any limitation on the wearable device. The wearable device may include more or fewer components than illustrated or may combine certain components or have different configurations or arrangements of components. For example, the wearable device further includes components such as a radio frequency (RF) circuit, an input unit, a sensor, an audio circuit, a loudspeaker, a microphone, a power supply, or the like, which are not described herein again.

A computer-readable storage medium is further provided in embodiments of the present disclosure. The storage medium store at least one instruction, and the at least one instruction is configured to be executed by the processor to perform the method for displaying the application interface as described in the foregoing embodiments.

A computer program product or computer program is further provided in embodiments of the present disclosure. The computer program product or computer program includes a computer instruction stored in a computer-readable storage medium. The computer instruction is configured to be read by the processor of the wearable device from the computer-readable storage medium, and the computer instruction, when executed by the processor, causes a terminal to perform the method for displaying the application interface as described in the foregoing embodiments.

Those skilled in the art should understand that in one or more of the above embodiments, the functions described in embodiments of the present disclosure may be implemented by any one or any combination of a hardware, a software, or a firmware. When implemented by software, functions may be stored in the computer-readable medium or transmitted as one or more instructions or codes in the computer-readable medium. The computer-readable medium includes a computer storage medium and a communication medium. The communication medium includes any medium that facilitates the transfer of a computer program from one place to another place. The storage medium may be any available medium that can be accessed by a general-purpose computer or a special-purpose computer.

The above are only optional embodiments of the disclosure and are not intended to limit the scope of protection of the disclosure. Any modification, equivalent arrangements, and improvement made within the spirit and principles of the disclosure shall be included in the scope of protection of the disclosure.

What is claimed is:

1. A method for displaying an application interface applicable to a wearable device, the wearable device supporting running of a first system and a second system, and the method comprising:
  drawing by the first system and displaying by the first system, a first interface of a target application in response to an application start-up instruction of the target application, when the first system is in a wake-up state and the second system is in a sleep state;
  drawing, by the second system, a second interface of the target application in response to the second system switching from the sleep state to the wake-up state, the second interface being the same as or different from the first interface; and
  displaying, by the second system, the second interface of the target application and running, by the second system, the target application, in response to the second system completing drawing the second interface.

2. The method of claim 1, wherein drawing by the first system and displaying by the first system, the first interface of the target application comprises:
  obtaining, by the first system, a target interface resource corresponding to the target application from a first storage space, the first storage space corresponding to the first system; and
  drawing by the first system and displaying by the first system, the first interface of the target application based on the target interface resource.

3. The method of claim 2, wherein obtaining, by the first system, the target interface resource corresponding to the target application from the first storage space comprises:
  obtaining, by the first system, target application information of the target application; and
  obtaining, by the first system, the target interface resource from the first storage space based on the target application information.

4. The method of claim 2, further comprising:
  sending, by the second system, an interface-resource update message to the first system, when the second system is in the wake-up state; and
  updating, by the first system, an interface resource stored in the first storage space based on the interface-resource update message.

5. The method of claim 4, wherein:
  sending, by the second system, the interface-resource update message to the first system when the second system is in the wake-up state comprises:
    obtaining, by the second system, first-application information of a first application in response to receiving a language update broadcast, when the second system is in the wake-up state, wherein a first interface-resource corresponding to the first application is stored in the first storage space; and
    sending, by the second system, a first-interface-resource update message to the first system, wherein the first-interface-resource update message contains the first-application information and updated first interface-resource; and
  updating, by the first system, the interface resource stored in the first storage space based on the interface-resource update message comprises:

storing, by the first system, the first-application information and the updated first interface-resource in an associative manner in the first storage space.

6. The method of claim 5, wherein obtaining, by the second system, the first-application information of the first application comprises:
sending, by the second system, a query message to the first system; and
sending, by the first system, the first-application information of the first application to the second system and deleting, by the first system, the first interface-resource corresponding to the first application from the first storage space.

7. The method of claim 5, wherein:
obtaining, by the second system, the first-application information of the first application comprises:
obtaining, by the second system, the first-application information of the first application from a second storage space, the second storage space corresponding to the second system; and
storing, by the first system, the first-application information and the updated first interface-resource in an associative manner in the first storage space comprises:
deleting, by the first system, the interface resource stored in the first storage space in response to identifying that the first-interface-resource update message contains a forced update identifier and storing, by the first system, the first-application information and the updated first interface-resource in an associative manner in the first storage space.

8. The method of claim 4, wherein:
sending, by the second system, the interface-resource update message to the first system when the second system is in the wake-up state comprises:
obtaining, by the second system, a second interface-resource and second-application information of a second application in response to monitoring a start-up manner update message of the second application, when the second system is in the wake-up state, wherein the start-up manner update message is indicative of a change of a start-up manner of the second application; and
sending, by the second system, a second-interface-resource update message to the first system, wherein the second-interface-resource update message contains an update manner, the second-application information, and the second interface-resource; and
updating, by the first system, the interface resource stored in the first storage space based on the interface-resource update message comprises:
updating, by the first system, the second interface-resource corresponding to the second-application information in the first storage space based on the update manner.

9. The method of claim 8, wherein updating, by the first system, the second interface-resource corresponding to the second-application information in the first storage space based on the update manner comprises:
storing, by the first system, the second-application information and the second interface-resource in an associative manner in the first storage space in response to the update manner being adding; and
deleting, by the first system, the second-application information and the second interface-resource from the first storage space in response to the update manner being deleting.

10. The method of claim 9, further comprising:
determining that an update conflict exists in response to the update manner being adding and the second-application information being stored in the first storage space; and
determining that the update conflict exists, in response to the update manner being deleting, the second-application information being stored in the first storage space, and the second-application information being used by a start-up manner other than a start-up manner to be deleted;
wherein when the update conflict exists, the second interface-resource in the first storage space is not updated.

11. The method of claim 8, wherein:
updating, by the first system, the second interface-resource corresponding to the second-application information in the first storage space based on the update manner comprises:
updating, by the first system, the second interface-resource corresponding to the second-application information in the first storage space based on the update manner, in response to identifying that the second-interface-resource update message does not contain any forced update identifier and there being no update conflict; and
the method further comprises:
updating, by the first system, the second interface-resource corresponding to the second-application information in the first storage space based on the update manner, in response to identifying that the second-interface-resource update message contains the forced update identifier.

12. The method of claim 2, wherein the first storage space is configured to store the interface resource corresponding to an application that is started in the first system, wherein a manner of starting in the first system an application comprises at least one of: starting via a shortcut key or starting via a widget of the first system.

13. The method of claim 1, wherein the target application is an application that the first system is unable to start and run, and the method further comprises:
waking up the second system in the sleep state in response to the application start-up instruction of the target application when the first system is in the wake-up state and the second system is in the sleep state, to make the target application started and run by the second system.

14. The method of claim 13, wherein displaying, by the second system, the second interface of the target application and running, by the second system, the target application, in response to the second system completing drawing the second interface comprises:
sending, by the second system, a switching instruction to the first system, in response to the second system completing drawing the second interface, wherein the switching instruction is used to instruct the first system to transfer a permission of displaying a graphical user interface (GUI); and
displaying, by the second system, the second interface of the target application and running, by the second system, the target application, in response to the second system obtaining the permission of displaying the GUI.

15. The method of claim 1, wherein the wearable device is configured with a first processor and a second processor, the second processor has power consumption higher than the first processor, the first system is run by the first processor, and the second system is run by the second processor.

16. A wearable device, comprising:
a processor and a memory, the memory storing at least one instruction, and the at least one instruction being configured to be executed by the processor to perform:
drawing by a first system and displaying by the first system, a first interface of a target application in response to an application start-up instruction of the target application, when the first system is in a wake-up state and a second system is in a sleep state;
drawing, by the second system, a second interface of the target application in response to the second system switching from the sleep state to the wake-up state, the second interface being the same as or different from the first interface; and
displaying, by the second system, the second interface of the target application and running, by the second system, the target application, in response to the second system completing drawing the second interface.

17. The wearable device of claim 16, wherein in terms of drawing by the first system and displaying by the first system, the first interface of the target application, the at least one instruction is configured to be executed by the processor to perform:
obtaining, by the first system, a target interface resource corresponding to the target application from a first storage space, the first storage space corresponding to the first system; and
drawing by the first system and displaying by the first system, the interface of the target application based on the target interface resource.

18. The wearable device of claim 17, wherein in terms of obtaining, by the first system, the target interface resource corresponding to the target application from the first storage space, the at least one instruction is configured to be executed by the processor to perform:
obtaining, by the first system, target application information of the target application; and
obtaining, by the first system, the target interface resource from the first storage space based on the target application information.

19. A non-transitory computer-readable storage medium storing at least one instruction, which, when executed by a processor, causes the processor to:
draw by a first system and displaying by the first system, a first interface of a target application in response to an application start-up instruction of the target application, when the first system is in a wake-up state and a second system is in a sleep state;
draw, by the second system, a second interface of the target application in response to the second system switching from the sleep state to the wake-up state, the second interface being the same as or different from the first interface; and
display, by the second system, the second interface of the target application and running, by the second system, the target application, in response to the second system completing drawing the second interface.

20. The non-transitory computer-readable storage medium of claim 19, wherein in terms of drawing by the first system and displaying by the first system, the first interface of the target application, the processor is caused to:
obtain, by the first system, a target interface resource corresponding to the target application from a first storage space, the first storage space corresponding to the first system; and
draw by the first system and displaying by the first system, the first interface of the target application based on the target interface resource.

* * * * *